United States Patent

[11] 3,588,473

[72] Inventor Dietrich Meyer
Hamburg, Germany
[21] Appl. No 702,904
[22] Filed Feb. 5, 1968
[45] Patented June 28, 1971
[73] Assignee U. S. Philips Corporation
New York, N.Y.

[54] ARRANGEMENT FOR FORMING THE QUOTIENT OF TWO FREQUENCIES
8 Claims, 4 Drawing Figs.

[52] U.S. Cl. 235/92, 235/196
[51] Int. Cl. G06f 7/39
[50] Field of Search 235/92, 24,66,57,68,60), 29 (F), 29 (TF), 196, 156, 164, 150.5; 328/161

[56] References Cited
UNITED STATES PATENTS
2,851,596 9/1958 Hilton 235/92
3,364,341 1/1968 Masel 235/196

*Primary Examiner*—Maynard R. Wilbur
*Assistant Examiner*—Joseph M Thesz, Jr.
*Attorney*—Frank R Trifari

ABSTRACT: In a circuit for producing an output proportional to the quotient of the frequencies of two input signals, the lower frequency signal is applied directly to an input of one gate and to an input of a flip-flop. The lower frequency signal is also applied by way of a delay circuit to the input of another gate and the other input of the flip-flop. The two outputs of the flip-flop are applied to the other inputs of the two gates, and the outputs of the gates are applied to a difference counter. The delay circuit provides a delay related to the higher frequency signal. The circuit may be provided with outputs for permitting cascade connections in order to obtain additional integers of the quotient.

INVENTOR
DIETRICH MEYER
BY
Frank R. [signature]
AGENT

INVENTOR.
DIETRICH MEYER
BY Frank R. Trifari
AGENT

ARRANGEMENT FOR FORMING THE QUOTIENT OF TWO FREQUENCIES

The invention relates to arrangements for forming the quotient of two frequencies comprising a difference counter and a preceding difference gate In known arrangements, the quotient $q$ of two frequencies $f_1$ and $f_2$ is formed by counting the pulses of the first frequency $f_1$ during a period of the second frequency $f_2$ or of a lower frequency $f_2/n$ obtained from this frequency by frequency division.

In this method, it is required that for the quotient formation with an accuracy of $1/p$ at least $p$ pulses of the frequency $f_1$ should be counted and that a counting interval of a corresponding length should be derived from the frequency $f_2$—as the case may be by division. If, for example, the frequency $f_1$ is 1000 $c/s$, the counting interval must be 1 sec. in case the quotient formation must take place with an accuracy of one per thousand. Moreover, a corresponding counting interval is required for reading the quotient stored in the counter, which process is effected, for example, optically by visualizing the content of the counter. It is not until then that a new quotient can be formed.

Upon variation of one of the two frequencies $f_1$ and $f_2$, the new quotient is formed only after the end of the counting interval which follows the frequency variation. In the said example, this consequently requires a time of at least 1 sec. This dead time is often undesirable, especially if the arrangement for quotient formation is an element of a control circuit.

A further disadvantage is that, in the case of quotients of the frequency $f_1$ and of the frequency constituting the counting interval not consisting of integers, the counting result in the last place jumps back and forth. If, for example, $q$=872.7, 70 percent of the counting results = "873" and 30 percent = "872."

The invention has for its object to avoid these disadvantages. According to the invention, this is achieved in an arrangement for forming the quotient of two frequencies comprising a difference counter and a preceding difference gate in that the pulses of the first frequency are applied directly to the forward input of the difference gate preceding the difference counter and to the backward input of this gate through a delaying circuit delaying these pulses by a time determined by the second frequency, while for the formation of carry signals acting as input signals for a similar further arrangement known means for reading the content of the difference gate may be switched on by pulses of a frequency derived from the second frequency.

The invention will now be described more fully with reference to the drawings, in which.

For a digital indication, the quotient $q$ of two frequencies $f_1$ and $f_2$ is represented as a series:

$$q=\frac{f_1}{f_2}=\frac{z_1}{B}+\cdots+\frac{z_n}{B^n}+\cdots \qquad (1)$$

($Z_n$ = positive integers), when $f_1 < f_2$ and hence $q < 1$. In this series, B is the basic number of the digital indication—for example 10 with a decimal or 2 with a binary indication—whilst $z_n$ represents the digits of the fraction 9—for example a decimal or binary fraction.

Figure 1:
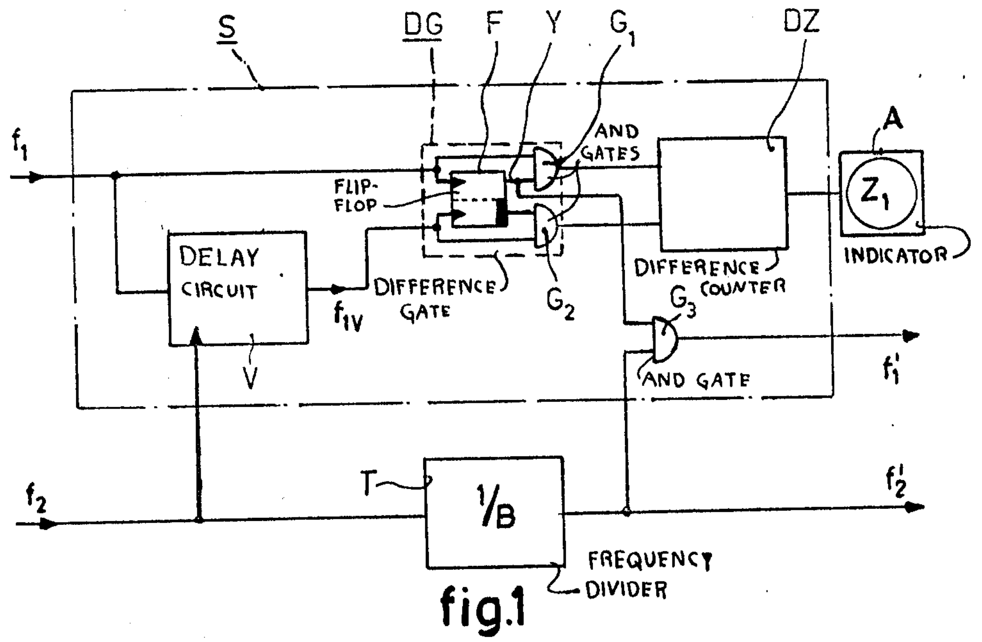
FIG. 1 shows an embodiment of the arrangement in accordance with the invention.

FIG. 1 shows an embodiment of the arrangement according to the invention for forming the quotient $q$ of two frequencies $f_1$ and $f_2$. The arrangement comprises a difference counter DZ having a counting capacity B and a preceding difference gate DG composed, for example, of a flip-flop F and two AND gates $G_1$ and $G_2$. The pulses of the frequency $f_1$ and applied directly to the forward input and through a delaying circuit V delaying them by B periods of the frequency $f_2$ as a frequency $f_{1r}$ to the backward input of the difference gate DG. The delaying circuit V may be, for example, a shift register controlled by the pulses of the frequency $f_2$ and having B stages.

Figure 2:
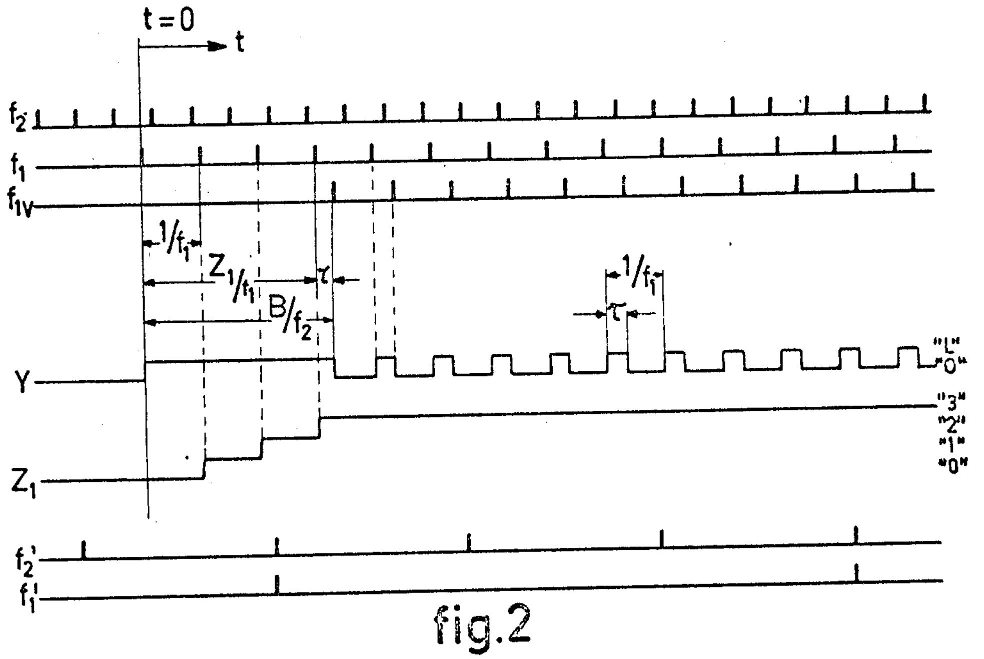
FIG. 2 shows a pulse diagram associated with FIG. 1.

The operation of the arrangement of FIG. 1 will be explained more fully with reference to the pulse diagram of FIG. 2, in which B is chosen to be equal to 5. The following considerations apply to a jump of the frequency quotient $q$ at the instant $t$=0 from 0 to a value which is constant for $t$>0. It is assumed that the flip-flop F of the difference gate DG is shown in the rest position. The first pulse of the frequency $f_1$ sets the flip-flop F at the output Y from O to L. Each further pulse is applied through the gate $G_1$ to the forward input of the difference counter DZ and increases the counter reading by 1 until the flip-flop F is reset to the initial position by the first pulse of the frequency $f_{1r}$ from the delaying circuit V. The first pulse of the frequency $f_{1r}$ is delayed with respect to the first pulse of the frequency $f_1$ by the time interval $B/f_2$. This interval covers $z_1$ forward counting pulses, since according to the equation 1 $z_1$ is the lower subsequent integer of $$f_1\cdot\frac{B}{f_2}=z_1+\frac{z_2}{B}+\cdots+\frac{Z_n}{B^{n-1}}+\cdots \qquad (2)$$

If B=10, the counter reading $Z_1$ Y of the difference counter DZ, which may be indicated, for example, by a digit indicator A, corresponds to the highest decimal place of the frequency quotient $q$. The time interval $\tau$ between the first pulse from the delaying circuit V, which resets the flip-flop F to its initial position, and the last pulse at the forward input of the difference gate of the flip-flop through this gate is according to the equation 2

$$\tau=\frac{B}{f_2}-\frac{Z_1}{f_1}=\frac{1}{f_1}\frac{z_2}{B}+\cdots+\frac{z_n}{B^{n-1}}+\cdots \qquad (3)$$

From now a pulse of the frequency $f_1$, which sets the flip-flop F at the output Y to L, is followed after each interval $\tau$ by a pulse of the frequency $f_{1r}$ which resets the flip-flop F to its initial position. Consequently, a square wave voltage is set up at the output Y of the flip-flop F, the pulses of which voltage have a width $\tau$ and a follow-on frequency $f_1$ so that according to the equation 3 the pulse width $$\tau\cdot f_1=\frac{z_2}{B}+\cdots+\frac{Z_n}{B^{n-1}}+\cdots \qquad (4)$$

correlated to the period of time $1/f_1$ is a measure for the second and further places—for example digital places—of the frequency quotient $q$.

An analog indication of this quantity can be obtained by means of a voltmeter indicating the mean value, for example, a moving-coil voltmeter, since the mean value $U_m$ of this voltage modulated by the pulse duration is $$U_m=\tau\cdot f_1\cdot U_s=\left[\frac{z_2}{B}+\cdots+\frac{z_n}{B^{n-1}}+\cdots\right]U_s \qquad (5)$$

if $U_s$ is the peak value of the said voltage. Thus, for example, the first decimal place of a frequency quotient may be measured as a digit, whereas the further decimal places may be measured as analogs, the accuracy requirement to be imposed on the analog part of the arrangement being a factor 10 lower than in the case of a pure analog measurement.

For further digital processing of the formation contained in the voltage at the output of the flip-flop, this voltage is read by means of a gate circuit $G_3$ by the output pulses of a frequency divider T dividing the input frequency $f_2$ by B. An output pulse of the divider T reaches the output of the gate circuit $G_3$ only if it coincides with the signal at the output Y of the flip-flop modulated by the pulse duration, i.e. if the inequality $$i\cdot\frac{1}{f_1}<j\cdot\frac{B}{f_2}<i\cdot\frac{1}{f_1}+\tau \qquad (6)$$

($i,j$=1, 2, 3, .....) is satisfied. The mean follow-on frequency $f_1'$ of the output pulses of the gate circuit $G_3$ is therefore $$f_1'=\frac{f_2}{B}\cdot\left[\frac{z_2}{B}+\cdots+\frac{z_n}{B^{n-1}}+\cdots\right] \qquad (7)$$

Figure 3:
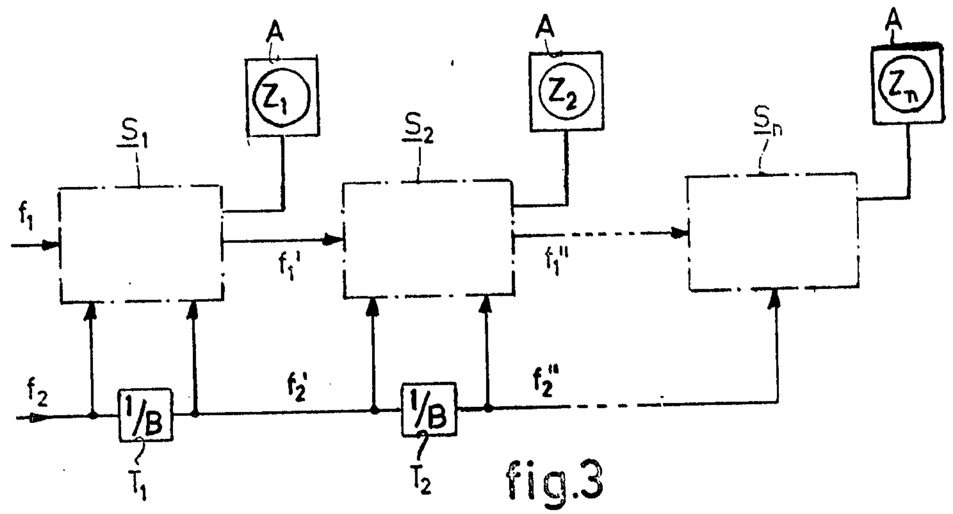
FIG. 3 shows a number of cascaded arrangements according to the invention.

The output frequency $f_1'$ of the gate circuit $G_3$ and the output frequency $f_2 = f_2/B$ of the divider T according to the equation 7 form a new frequency quotient $q$ $$q' = \frac{f_1'}{f_2'} = \frac{z_2}{B} + \qquad + \frac{z}{B^{n-1}} + \qquad (8)$$

as a carry. The signals $f_1$ and $f_2$ may act for a further arrangement of the kind shown in FIG. 1 as an input quantity which indicates the second place and the transmission signals $f_1''$ and $f_2'' f_2/B^2$ are input quantities of a third arrangement of the said kind, and so on. Such a cascade arrangement is shown in FIG. 3.

Figure 4:
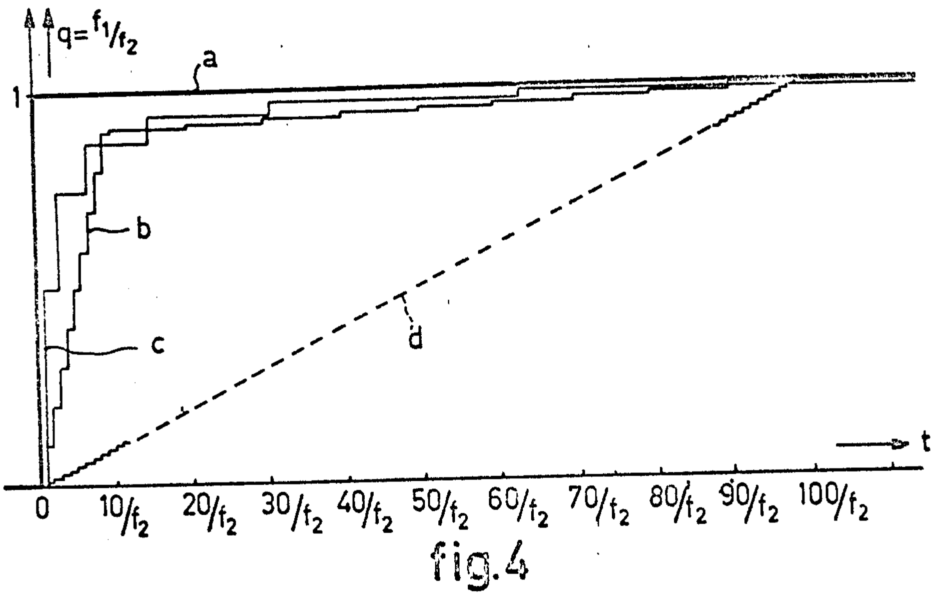
FIG. 4 shows a diagram of counter readings associated with FIG. 3.

When compared with known arrangements for forming a frequency quotient $q$, an improvement in the dynamic behavior upon variations of the frequency quotient is obtained with the cascade arrangement in accordance with the invention. In FIG. 4, the responses to a unit jump of $q$ ($q=0$ for $t < 0$, $q=1$ for $t \geq 0$) (curve $a$) of two cascaded arrangements according to the invention in which B=10 (decimal two-digit quotient formation) (curve $b$) and of seven cascaded arrangements according to the invention in which B=2 (binary seven-digit quotient formation) (curve $c$) are compared with the response of a known arrangement having a counting capacity 100 (curve $d$). Whereas in a known arrangement the content of the counter increases uniformly until after, for example, 100 periods of the frequency $f_2$, it reaches the final value which indicates the frequency quotient $q$ with an accuracy of 1 percent, a cascade arrangement according to the invention exhibits a rapid increase until the final value is approached so closely that after $B^n$ ($n=1, 2, 3, \ldots$) periods of the frequency $f_2$, the maximum deviation from the final value is $1/B^n$.

In known arrangements, the correct quotient formation can take place only at the measuring interval which follows a variation of the frequency quotient. An arrangement according to the invention, however, responds immediately after the occurrence of the variation in the manner described above. If variations occur at time intervals shorter than the measuring interval, a new quotient cannot be formed with a known arrangement. In a cascade arrangement according to the invention, however, a correct quotient formation is still obtained at the higher places. If, for example, the frequency quotient $q$ varies after each 10 pulse intervals of the frequency $f_2$, the quotient is formed correctly at the highest decimal place $z_1$ and at the three highest binary places $z_1$, $z_2$, $z_3$, respectively, as is apparent from FIG. 4.

When compared with the known arrangements, this arrangement for quotient formation has the additional advantage that, if the quotient does not vary, the lowest place does not jump back and forth between two adjacent digits even if one of the subsequent places not indicated is not equal to 0.

In a further embodiment according to the invention, each of a number of cascaded arrangements sets will have a signal at the output of $G_1$ when the content of its difference counter increases. Decreasing the state of the difference counter produces a signal at the output of gate $G_2$. By these two signals an increase or decrease of the difference counter state is detected. It is not necessary to employ separate detecting means as the signals at outputs $G_1$ and $G_2$ can directly change the states of delay circuits $V_1$ flip-flops DG and counters DZ to other states, such as initial positions. When the content of its difference counter decreases, it sets all the said storage elements to the opposite position and the counter readings of the difference counters DZ to their final values. Thus, it is achieved that, upon a variation of the frequency quotient, for example, from $q=0.49$ to $q=0.51$, the new value is not attained in the order of succession 0.49—0.59 —0.58— —0.52 —0.51, which would be the case without this variation, but in the order of succession 0.49—0.500.51.

The pulses of the frequency $f_1$ may also be synchronized with the pulses of the frequency $f_2$, or the pulses of these two frequencies may be synchronized with a clock pulse. The coincidence stage which must then precede the difference gate DG is not shown in the arrangement described.

I claim:

1. An arrangement for dividing first frequency pulse signals by second frequency pulse signals to form quotients having significant figures related to a digital or decimal base, comprising means for delaying said first frequency pulses for time intervals determined from a number of said second frequency pulses representing said base, difference gating means for receiving undelayed and delayed first frequency signals to produce pulse and analog signals representing prime and remainder significant figures to said base respectively, indicating means for displaying said prime significant figures from said difference gating pulse signals, means for dividing said second frequency signals by the number of said second frequency pulses representing said base to produce subharmonics of said second frequency signals, and gating means for producing first frequency carry signals representing said remainder significant figures from said second frequency subharmonic signals and said difference gating analog signals.

2. An arrangement as claimed in claim 1 wherein said delay means has a delay time $\beta/f_2$, said $\beta$ being a selected number of second frequency signal pulses $f_2$ representing said base.

3. An arrangement as claimed in claim 1 wherein said difference gating means comprises a flip-flop for receiving said undelayed and delayed first frequency signals to produce analog signals characterizing said prime and remainder significant figures, and first difference gating means for passing first frequency pulses occurring within said delay time intervals to produce pulse signals representing said first significant figure.

4. An arrangement as claimed in claim 1 wherein said indicating means comprises difference counting means for counting the number of first frequency pulses to be displayed as representing said prime significant figure.

5. A plurality of cascaded connected arrangements as claimed in claim 1 for forming said quotients having a number of significant places equal to the number of said arrangements.

6. An arrangement as claimed in claim 2 wherein said delay means comprises a shift register controlled by said second frequency signals and having a number of stages equal to said number of second frequency pulses representing said base.

7. An arrangement as claimed in claim 4 wherein said difference counting means comprises means for detecting changes in the number of first frequency pulses counted, and control means for interconnecting a flip-flop and said difference counting means, said control means setting said flip-flop and said difference counting means to an initial operating position when said numbers of first frequency pulses counted increase and to a final operating position when said numbers of first frequency pulses counted decrease, thereby to vary said quotient variations in an optimum order of succession.

8. An arrangement as claimed in claim 3 wherein said difference gating means further comprises second gating means for resetting said indicating means.

UNITED STATES PATENT OFFICE
CERTIFICATE OF CORRECTION

Patent No. 3,588,473 Dated June 28, 1971

Inventor(s) Dietrich Meyer

It is certified that error appears in the above-identified patent and that said Letters Patent are hereby corrected as shown below:

Column 1, line 73, "and", second occurrence, should read -- are --. Column 2, line 23, cancel "Y"; line 29, "of the flip-flop" should read -- DG to pass --; line 62, after "output" insert -- Y --. Column 4, line 6, "0.500.51" should read -- 0.50-0.51 --.

Signed and sealed this 18th day of January 1972.

(SEAL)
Attest:

EDWARD M.FLETCHER,JR.
Attesting Officer

ROBERT GOTTSCHALK
Acting Commissioner of Patents